Dec. 27, 1949     H. R. FOSTER     2,492,278

FINGERTIP APPLICATOR

Filed Feb. 20, 1948

INVENTOR.
Hazel R. Foster
BY
ATTORNEY

Patented Dec. 27, 1949

2,492,278

UNITED STATES PATENT OFFICE 2,492,278

FINGERTIP APPLICATOR

Hazel R. Foster, Los Angeles, Calif.

Application February 20, 1948, Serial No. 9,702

6 Claims. (Cl. 15—227)

This invention relates to an adaptor for use in the application of cosmetics, deodorants and the like and more particularly, to a fingertip applicator and adaptor that may be transferred from the fingers of one hand to the other without the fingers coming into contact with the substance being applied.

Most all cosmetics, deodorants and the like are of such a nature that during their application, the fingers of the user becomes stained, greasy or discolored, which necessitates washing the hands after the application of such ingredients. Moreover, when the fingers are used in applying an underarm cream, deodorant or other creamy or pasty cosmetic preparation, a large proportion of such preparation is wasted and the application is not even or uniform. In addition, fingers of both hands are covered with the cream or paste and much of the cream is left upon the jar or container from which the cream is drawn, resulting in a messy operation tending to soil jars, tables, cloths etc. It is, therefore, a primary object of this invention to provide an applicator and adaptor that may be transferred from the fingers of one hand to the fingers of the other hand, whereby a substance may be applied to the different portions of the body by the fingers of both hands without the fingers coming into contact with the substance being applied.

Another object is to provide a fingertip adaptor provided with oppositely disposed finger stalls that will be oilproof and grease resistant and which may be used continuously without the surfaces of the finger stalls becoming soiled by contact with the substance being applied by the adaptor.

A further object is to provide a light weight, simple applicator whereby make-up, face creams, salves, etc., may be easily, smoothly and efficiently applied.

It is a further object to provide a fingertip adaptor that may be manufactured at such a low cost that it will justify the manufacturers of cosmetics, deodorants, etc., to supply the adaptor with their product without increasing the sales price of the product, thereby augmenting the interests of the public to purchase such products.

Still another object is to provide a fingertip adaptor that may be sold in quantities and at such a cost that the adaptor may be discarded after a single use.

The above and other objects may be made apparent throughout the further description of the invention when taken in connection with the accompanying drawings, wherein like reference characters refer to like parts. It is to be understood that the drawings are not a definition of the invention but merely illustrate an exemplary form by means of which the invention may be effectuated.

Figure 1:
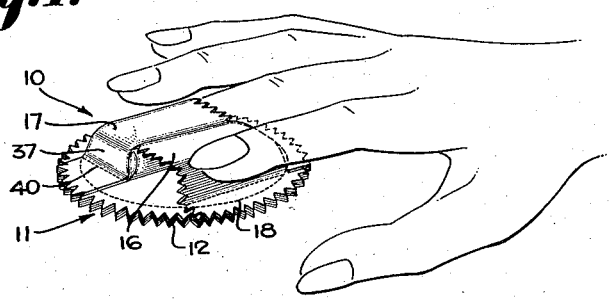
Fig. 1 is an isometric view of an adaptor embodying the invention showing the same attached to the right hand of a user.
Figure 2:
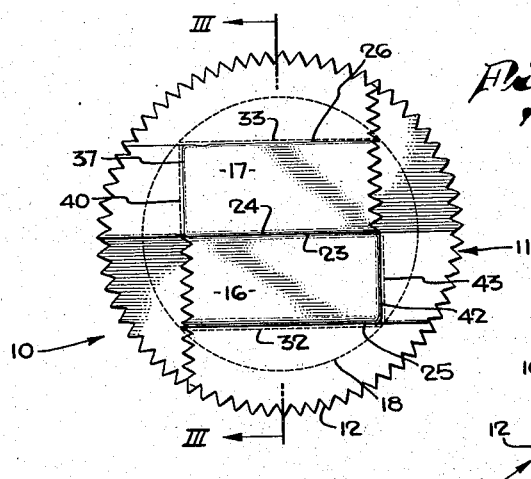
Fig. 2 is an enlarged top plan view of the adaptor shown in Fig. 1.
Figure 3:
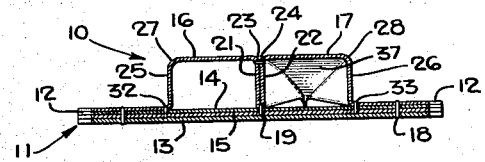
Fig. 3 is a sectional view taken along the line III—III of Fig. 2.

Referring to the drawings, the numeral 10 indicates an adaptor in its entirety involving the invention. The adaptor may consist of an adaptor body, indicated in its entirety by 11. The body 11 is preferably round, and for the sake of appearance may be notched or scalloped about its periphery, as shown at 12. The body 11 may consist of a plurality of layers of sheet material. In the form shown, there is provided a base 13 employed as the adaptor surface. A top 14 is provided, which is preferably of plastic or synthetic composition which is oilproof and grease resistant, and intermediate the bottom 13 and plastic top there is provided a liner 15 which may be of flannel or other cloth.

Figure 4:
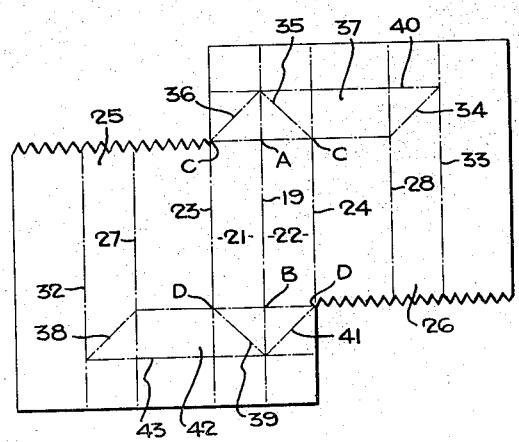
Fig. 4 is a pattern of the material from which the finger stalls may be formed.

The finger stalls 16 and 17 are preferably made of flexible, compliant sheet material (cloth or synthetic) cut from a pattern, as illustrated by Fig. 4. The stalls may be formed by sewing them onto the top 14 or, as shown, sewing the stalls onto the top 14 and intermediate liner 15. Thereafter, the bottom 13 may be assembled and sewed onto the liner 15 and top 14 by a circular seam, as indicated at 18.

In the forming of the stalls 16 and 17, the pattern is first sewed to 14 along the seam 19 between the points, as indicated at A and B. Thereafter, the pattern is folded along the seam 19, and the two sides 21 and 22 adjacent the seam 19 are sewed together along the lines, as indicated at 23 and 24, between the points C and D, as clearly shown by Fig. 4. The sides 21 and 22 form the inner sides and separate the stalls 16 and 17. The outer sides 25 and 26 of the stalls 16 and 17, respectively, are formed by bending the material along the lines indicated at 27 and 28. The portions of the material indicated at 25 and 26 are positioned vertically, and the material sewed to the top 14 along the lines 32 and 33, respectively. Lines of stitching or attachment 32 and 33 are parallel to and spaced from the line of stitching or seam 19.

In order to form the closed end of the stall 17, the material is folded along the lines 34, 35 and 36 in substantially the same manner as an envelope is folded, the portion indicated at 37 forming the closed end of the stall 17, the portion 37 being positioned vertically and sewed to the top 14 along the line 40. The closed end of the stall 16, which is oppositely disposed to the stall 17, is formed in like manner by folding the material along the lines 38, 39 and 41, and the portion 42 forming the closed end of the stall 16 is positioned vertically, and the material sewed along the line 43 in the same manner as that described in connection with stall 17. After the stalls 16 and 17 have been formed and sewed onto the top 14 and intermediate the flannel liner 15, then the bottom or applicator surface is sewed to the flannel liner and top 14 by circular seam 18.

Since the finger stalls 16 and 17 and the top 14 are oilproof and grease resistant, the fingers of the users are protected from the substance being applied. Fig. 1 illustrates the manner in which the stall is adapted to be carried by the right hand. In the case of the right hand, the middle finger of the user is inserted into stall 17, the index finger being positioned on top of the stall 16 for exerting the necessary pressure. When it is desired to transfer the applicator from the right hand to the left hand, then the user inserts his index finger of the left hand into the stall 16, permitting the middle finger of the left hand to rest on the top of the stall 17, thereby affording the required grip for manipulating the device.

Accordingly, there is provided a fingertip adaptor that may be readily transferred from one hand to the other without the fingers of either hand coming in contact with the substance being applied by the adaptor. The adaptor is simple, efficient in operation and can be produced at a very small cost.

While I have illustrated and described an exemplary form of the present invention, it will now be apparent to those skilled in the art that certain changes, modifications, additions, substitutions and omissions may be made in the single form shown without departing from the spirit and scope of the appended claims.

I claim:
1. A fingertip applicator comprising a base having a pair of finger stalls fixed to the upper side thereof, each stall having a closed end and an open end, said stalls having a longitudinally extending partition therebetween and being so disposed that the open end of each stall is adjacent the closed end of the other.

2. A fingertip applicator in accordance with claim 1, wherein the said base is provided with a grease resisting cover.

3. A fingertip applicator in accordance with claim 1, wherein the said base includes a bottom, top and an intermediate liner, the said finger stalls being fixed to the said top independently of the said bottom.

4. A fingertip applicator including a substantially flat base, said base having a lower surface and upper surface and a pair of longitudinally extending parallel oil resisting finger stalls fixed to said upper surface, each stall having a closed end and an open end, said stalls having a longitudinally extending partition therebetween and being so disposed that the open end of each stall is adjacent the closed end of the other.

5. A fingertip applicator including a substantially flat base of resilient material having an upper surface and a lower surface, and a plurality of finger stalls fixed to said upper surface, each stall having side walls, a top, a closed end and an open end, said stalls being so disposed that the open end of each stall is adjacent the closed end of another stall.

6. A fingertip applicator including a base having an upper surface and a lower surface, and a plurality of finger stalls fixed to said upper surface, each stall having side walls, a top, a closed end and an open end, said stalls being so disposed that the open end of each stall is adjacent the closed end of another stall.

HAZEL R. FOSTER.

REFERENCES CITED

The following references are of record in the file of this patent:

UNITED STATES PATENTS

| Number | Name | Date |
| --- | --- | --- |
| 1,554,510 | Kirby | Sept. 22, 1925 |
| 1,975,260 | Englander | Oct. 2, 1934 |
| Re. 19,796 | Mar | Dec. 24, 1935 |
| 2,121,701 | Landers | June 21, 1938 |